United States Patent [19]
Jacobs

[11] 3,816,158
[45] June 11, 1974

[54] BONDING AND FORMING INORGANIC MATERIALS

[76] Inventor: Louis John Jacobs, 6153 N. Legett, Chicago, Ill. 60646

[22] Filed: July 11, 1972

[21] Appl. No.: 270,785

[52] U.S. Cl.................... 117/26, 117/29, 264/109, 264/111
[51] Int. Cl.......................... B44d 1/094, B44c 1/06
[58] Field of Search......... 117/16, 26, 29, 69, 70 R, 117/70 A, 70 C, 70 D, 100 B, 169; 264/134, 109; 106/38.9, 38.27

[56] References Cited
UNITED STATES PATENTS

| | | | |
|---|---|---|---|
| 2,809,124 | 10/1957 | Rick................................ | 117/169 X |
| 2,901,379 | 8/1959 | Shannon et al............. | 117/169 R X |
| 3,455,731 | 7/1969 | Nielsen et al............... | 117/169 R X |
| 3,522,079 | 7/1970 | Wiseman........................ | 117/100 B |
| 3,617,358 | 11/1971 | Dittrich........................... | 117/100 B |

Primary Examiner—Michael Sofocleous
Assistant Examiner—Shrive P. Beck
Attorney, Agent, or Firm—Richard H. Berneike

[57] ABSTRACT

Components for apparatus of various shapes are formed from inorganic particulate materials and binders. The base material is selected from the metal oxides and those metals and metal carbides which contain a small amount of oxide on the surface, for example, alumina. These particles are treated with a binder solution which may be any solution of an inorganic compound that can be converted to an oxide on being heated, for example, chromium trioxide solution. The particles are then coated with a fine powdered material of the same composition as the base particles to form free-flowing pellets. The pellets are then heated to convert the binder material to the oxide form. The treatment with binders and the heating step are then repeated as often as desired. The pellets are then impregnated with additional binder and formed into the desired shape and again heated. The formed shape is then impregnated with additional binder and heated as often as desired to obtain the desired properties. The shapes can then be machined and various shapes can be joined together.

9 Claims, No Drawings

BONDING AND FORMING INORGANIC MATERIALS

BACKGROUND OF THE INVENTION

The present invention relates to the formation of corrosion and abrasion resistant shapes from inorganic particulate materials.

Components for various apparatus, machines and equipment typically manufactured from metal, such as by casting, are subject to corrosive and abrasive conditions such as in chemical process equipment, particle size separation and reduction equipment and material handling equipment. It is often difficult to form complex metal pieces by conventional metal forming techniques and it is often impossible or difficult to join pieces together such as by welding while maintaining corrosion and abrasion resistance.

SUMMARY OF THE INVENTION

The present invention relates to the formation of shapes from particulate materials which may be any metal oxide or any metal or metal carbide which contains a small amount of oxide film on the surface thereof. These particles are treated with binder and then coated with a fine powdered material of the same composition which forms free-flowing pellets. These free-flowing pellets are then heated and formed into shapes by any desired forming operation. The formed shape is then further treated with binders and heated to produce the final corrosion and abrasion resistant product which can be machined and joined to other shapes if desired.

DESCRIPTION OF THE PREFERRED EMBODIMENT

In the present invention, an inorganic material of fine particle size is mixed with an aqueous solution of an inorganic compound that acts as a binder. The moist particles are then coated with a finely divided powder by continued mixing to form rounded agglomerates of the desired size. After mixing, the material is passed through a screening device to remove objectionable oversize pellets. The pellets passing through the screening device are then heated to 900° to 1,200°F and cooled. Additional binder solution is then sprayed on the pellets while passing through a paddle type mixer. The pellets are again heated to 900° to 1200°F. Impregnation with the binder solution and heating is repeated until the pellets have sufficient strength for the particular item to be formed. Just prior to forming the pellets into the desired shape, the pellets are not heated after impregnation but sent directly to the forming operation. The shape is formed by any of the conventional forming processes such as isostatic pressing, forming on a hydraulic or mechanical press, or ramming into a mold box. After forming, the shape is heated to 900° to 1,200°F to thoroughly bond the pellets together. The formed shape is then impregnated with additional binder solution after which the part is again heated to 900° to 1,200°F. This impregnation and heating cycle is repeated until the part has the desired strength, density and hardness. The present invention is particularly suited to the formation of components that are subject to destruction by abrasion and corrosion as well as elevated temperature. Examples are pump impellers and liners, valve gates and seats, cyclones for solid separation systems, injectors, venturies, nozzles, liners for material handling systems, furnace components, and seals but the invention is not intended to be limited to these items.

The fine particles of inorganic material for use in the present invention are selected from metal oxides and those metals and metal carbides which contain a small amount of oxide on the surface. Examples are alumina, silicon carbide, sintered chrome oxide, silica, zirconia, tungsten carbide, and the metal powders of iron, chromium, copper, aluminum, manganese and molybdenum.

Using alumina as an example, 700 pounds of 325 mesh alumina, such as Alcoa T-60 grade alumina, is charged into a muller type mixer. This alumina has the following specifications:

|  | % |
|---|---|
| Alumina | 99.5 |
| Silica | 0.06 |
| Ferric Oxide | 0.06 |
| Sodium Oxide | 0.02 |
| Apparent porosity | 5.0 |
| Particle size retained on 200 mesh | 0.05 to 0.3 |

For example, a 6 foot diameter Simpson Intensive Mixer may be used with the mullers set ¾ inch above the bottom of the mixer with the inner and outer plows set as close to the bottom as possible, the inner plow so positioned to direct the material into the path of the muller and the outer plow positioned to turn the material over immediately after the muller. The mixer is started and then 100 pounds of the following binder solution is sprayed on to the material in the mixer:

Solution "A"

| Chromium trioxide, Technical grade | 100 lbs. |
|---|---|
| Zinc oxide, Technical grade | 16.3 lbs. |
| Water to produce a solution with a specific gravity of 1.7 | |

After Solution A has been sprayed on the material in the mixer, which should take about three minutes, 300 pounds of finely ground reactive alumina is slowly added to the materials in the mixer while it is operating. As an example, the finely ground reactive alumina may be Alcoa A-16 Superground grade alumina having the following specifications:

| Alcoa A-16 Superground: | Reactive Alumina |
|---|---|
|  | % |
| Alumina | 99.5 |
| Silica | 0.05 |
| Sodium oxide | 0.08 |
| Particle size | Less than 1 micron |

The addition of the finely ground alumina will require about seven minutes and the finely ground alumina will coat the agglomerates formed in the mixer and form free flowing generally rounded pellets that will immediately discharge from the mixer at the end of the mixing cycle. Upon discharge from the mixer, the pellets are passed over a 30 mesh screening unit. The over size pellets are returned to the mixer to be blended with the uncoated material being charged into the mixer for the next batch.

Substitutes for the finely ground reactive alumina may be finely ground materials corresponding to the list of materials given above for the fine particles of inorganic material used as the base material. These finely ground materials need not be reactive but the reactive alumina is preferred because of the high surface to weight ratio. Substitutes for the chromium trioxide binder solution used to form Solution A may be any solution of an inorganic compound that can be converted to an oxide on being heated, i.e., monoaluminum dihydrophosphate solution with a specific gravity of 1.8, zirconium oxychloride solution or a 50 percent zirconium acetate solution.

Other types of equipment may be used in place of the muller type mixer to form the pellets. For example, a Dravo-Lurgi Disc may be used. The disc is set at an angle of 50° to 55° and the alumina is fed onto the disc at the six o'clock position one half way down from the center of the disc. The Solution A is sprayed on at the seven o'clock position and the finely ground reactive alumina is added at the eight o'clock position. The feeders are set to deliver the materials at a desired continuous rate and the pellets are continuously removed from the disc.

Another form of mixer which may be used is a paddle mixer in combination with a rod mill or balling drum. The alumina is added to the mixer and then Solution A is sprayed into the mixer over a period of three minutes. Then the finely ground reactive alumina is added and the material is discharged into the balling drum equipped with six rods. The continuous discharge from the balling drum is fed through the screening unit and the over size pellets are returned to the drum.

The free-flowing pellets which pass through the 30 mesh screen are heated to 900° to 1,200°F in a fluidized bed heating unit. This heating operation is continued just long enough to heat the pellets to the maximum desired temperature and then the pellets are immediately removed from the heating unit. This heating operation may be a continuous operation with the feed rate of the pellets being controlled to obtain the desired discharge rate of the heated pellets. In place of a fluidized bed heating unit, a rotary calciner with counter flow or a vibrating hearth calciner may be used. The heating of the pellets converts the materials in the binder to the oxide form; for example, the chromium trioxide solution (chromic acid) would be converted to chromic oxide.

Upon removal from the heating unit, the pellets are cooled to about 400°F or lower and then charged into a paddle type mixer and sprayed with the following solution:

SOLUTION B

Chromium trioxide, technical grade
Water to produce a solution with a specific gravity of 1.7

The pellets are thoroughly saturated and the excess solution is drained from the pellets. The pellets are again heated to 900° to 1,200°F in the heating unit to convert the Solution B to the oxide form. The pellets are then charged into the paddle mixer for a second time and again saturated with Solution B with the excess solution being drained. Then, 10 pounds of the finely ground alumina is added and mixing is continued long enough to coat the saturated pellets with the finely ground alumina. Upon discharge from the paddle mixer, the alumina coated pellets are sent directly to the forming operation. The pellets at this stage are very free flowing and will readily and uniformly fill a mold. This ability to be free flowing allows the forming of extremely complex shapes with uniform density. Any desired forming process may be used such as isostatic pressing, forming on a hydraulic or mechanical press, or ramming into a mold box.

Upon removal of the formed part from the press, it is heated in an oven at 900° to 1,200°F to again convert the binder to the oxide form. The rate of heating is controlled to keep the thermal stresses to a minimum and the duration of heating is just long enough to permit the shape to reach the desired temperature at the center of the thickest section. The part is then cooled to about 400°F or lower and immersed in a tank of Solution B. After removal from the tank of Solution B, the part is sprayed with water to remove excess solution from the surface. If this excess solution were not removed, a spongy mass of oxide would build up on the surface when the part is heated. After the part has been sprayed with water, it is again heated to 900° to 1,200°F. After removal from the heating unit, the part may be machined to the desired tolerances if required.

Although Solution B has been described as being a solution of chromium trioxide (chromic acid), this Solution B may be formed from the following materials: phosphoric acid 75 percent, zirconium oxychloride solution, zirconium acetate solution 50 percent, or monoaluminum dihydrophosphate solution.

The part which has now been formed may be joined to other parts which may be of the same composition or may be a metal part such as a bushing, bolt, nut or whatever component is required in the overall design. These parts are cemented together using a solution of the following composition:

Solution C

Chromium trioxide, technical grade 100 lbs.
Water to produce a solution with a specific gravity of 1.7

To this solution Alumina Alcoa A-16 superground is added to increase the viscosity to the consistency of a syrup, approximately 2,600–3,000 centipoise This Solution C is spread on the area where the two parts are to be cemented together. Then the two parts are pressed together and heated to 300°F and held at this temperature long enough for the pieces to reach this temperature throughout the entire mass. Then the temperature is raised to 900° to 1,200°F to convert the cementing Solution C to the oxide form. The cemented pieces are then cooled to about 400°F or lower and immersed in a tank of Solution B until the part is at room temperature. After removal from the tank of Solution B, the part is again sprayed with water to remove excess solution from the surface. The part is again heated to 900° to 1,200°F. This immersion, spraying, and heating cycle is repeated until the desired density and hardness are obtained.

The particle sizes which have been noted above for fabrication of a typical shape may be increased to whatever particle size is required to produce the desired properties. The particle size description determines the density and amount of porosity in a particular shape. The amount of finely ground material such as the finely ground alumina used to coat the wetted coarse metal can be varied depending upon the surface area to be coated. A smaller amount of fine material is needed to coat coarse particles and rounded particles need less coating material than angular particles. The difference in particle size between the particles to be coated and the coating material is relative, i.e., a fine particle to be coated requires a finer coating material than a coarse particle to be coated. The objective is to coat the coarse, moist or sticky particles with dry, finely divided particles so as to produce the free-flowing agglomerates.

As pointed out above, the present invention is particularly suited to the fabrication of shapes which are subject to destruction by abrasion and/or corrosion. Very complex components can be fabricated at lower costs. Also, parts fabricated by this process are suitable for service in a wide temperature range from room temperature to 3,000°F or more, depending on the particular particles used in forming the main mass of the particle. Parts can be joined together that would be impossible or very difficult to weld or form by other techniques because of the complexity of the design and the necessity for maintaining abrasion and corrosion resistance. The joint formed by bonding two parts together with Solution C will result in a joint that is stronger than the remainder of the parts and the joint will also have the same or better abrasion and corrosion resistance.

Although the invention has been described with reference to a preferred embodiment and various alternatives, it will be understood that the invention is to be limited only by the claims listed below.

What is claimed is:

1. A method of producing a shape comprising the steps of:
   a. providing a quantity of relatively fine particles of a first size, said relatively fine particles being selected from the group consisting of metal oxides and those metals and metal carbides which contain an oxide film on the surface thereof;
   b. mixing a first binder solution with said relatively fine particles to form agglomerates, said binder solution being selected from those solutions of inorganic compounds that are converted to an oxide on being heated;
   c. coating said agglomerates with finely divided particles of a second size smaller than said relatively fine particles of a first size to form free-flowing pellets, said finely divided particles of a second size being selected from said group consisting of metal oxides and those metals and metal carbides which contain an oxide film on the surface thereof;
   d. heating said free-flowing pellets so as to convert said binder solution to the oxide;
   e. cooling said pellets;
   f. treating said cooled pellets with a second binder solution, said second binder solution being selected from those solutions of inorganic compounds that are converted to an oxide on being heated;
   g. heating said pellets treated with said second binder solution so as to convert said second binder solution to the oxides;
   h. cooling said heated pellets from step (g);
   i. treating said pellets from step (h) with additional second binder solution;
   j. coating said binder coated pellets from step (i) with finely ground particles selected from the group consisting of metal oxides and those metals and metal carbides which contain an oxide film on the surface thereof;
   k. forming said pellets from step (j) into the desired shape;
   l. heating said formed shape to convert said second binder solution from step (i) to the oxide;
   m. cooling said formed shape from step (l) and treating with additional said second binder solution;
   n. removing excess second binder solution from the surface of said formed shape; and
   o. heating said formed shape from step (n) to convert said additional second binder solution to the oxide.

2. A method as recited in claim 1 wherein said metal oxides and those metals and metal carbides which contain an oxide film on the surface thereof are selected from the group consisting of alumina, silicon carbide, sintered chrome oxide, silica, zirconia, tungsten carbide and the metal powders of iron, chromium, copper, aluminum, manganese and molybdenum.

3. A method as recited in claim 2 wherein said relatively fine particles of a first size are alumina.

4. A method as recited in claim 2 wherein said finely divided particles of a second size are finely ground reactive alumina particles.

5. A method as recited in claim 2 wherein said first binder solution is selected from a group consisting of solutions of chromium trioxide, monoaluminum dihydrophosphate, zirconium oxychloride and zirconium acetate.

6. A method as recited in claim 2 wherein said first binder solution is a solution containing chromium trioxide and zinc oxide.

7. A method as recited in claim 6 wherein said heating steps comprise heating to a temperature of about 900° to 1,200°F and wherein said cooling steps involve cooling to a temperature below about 400°F.

8. A method as recited in claim 5 wherein said second binder solution is selected from the group consisting of solutions of chromium trioxide, phosphoric acid, zirconium oxychloride and monoaluminum dihydrophosphate.

9. A method as recited in claim 8 wherein said second binder solution is a solution of chromium trioxide.

* * * * *

UNITED STATES PATENT OFFICE
CERTIFICATE OF CORRECTION

Patent No. 3,816,158          Dated June 11, 1974

Inventor(s) Louis John Jacobs

It is certified that error appears in the above-identified patent and that said Letters Patent are hereby corrected as shown below:

On Page 1 after:

[76] Inventor: Louis John Jacobs, 6153 N. Legett, Chicago, Ill. 60646 insert

Assignee: Combustion Engineering, Inc. Windsor, Connecticut

Signed and sealed this 5th day of November 1974.

(SEAL)
Attest:

McCOY M. GIBSON JR.
Attesting Officer

C. MARSHALL DANN
Commissioner of Patents